United States Patent
Murray et al.

(10) Patent No.: US 9,424,492 B2
(45) Date of Patent: Aug. 23, 2016

(54) WEIGHTING SCHEME FOR POOLING IMAGE DESCRIPTORS

(71) Applicant: Xerox Corporation, Norwalk, CT (US)

(72) Inventors: Naila Murray, Arima (TT); Florent C. Perronnin, Domene (FR)

(73) Assignee: XEROX CORPORATION, Norwalk, CT (US)

( * ) Notice: Subject to any disclaimer, the term of this patent is extended or adjusted under 35 U.S.C. 154(b) by 270 days.

(21) Appl. No.: 14/141,612

(22) Filed: Dec. 27, 2013

(65) Prior Publication Data

US 2015/0186742 A1 Jul. 2, 2015

(51) Int. Cl.
G06K 9/46 (2006.01)
G06K 9/62 (2006.01)

(52) U.S. Cl.
CPC ............ G06K 9/629 (2013.01); G06K 9/4676 (2013.01)

(58) Field of Classification Search
None
See application file for complete search history.

(56) References Cited

U.S. PATENT DOCUMENTS

| | | |
|---|---|---|
| 2007/0005356 A1 | 1/2007 | Perronnin |
| 2007/0258648 A1 | 11/2007 | Perronnin |
| 2008/0069456 A1 | 3/2008 | Perronnin |
| 2009/0144033 A1 | 6/2009 | Liu et al. |
| 2010/0092084 A1 | 4/2010 | Perronnin et al. |
| 2010/0098343 A1 | 4/2010 | Perronnin et al. |
| 2010/0189354 A1 | 7/2010 | de Campos et al. |
| 2010/0191743 A1 | 7/2010 | Perronnin et al. |
| 2010/0318477 A1 | 12/2010 | Perronnin et al. |
| 2011/0026831 A1 | 2/2011 | Perronnin et al. |
| 2011/0040711 A1 | 2/2011 | Perronnin et al. |
| 2011/0091105 A1 | 4/2011 | Perronnin |
| 2011/0137898 A1 | 6/2011 | Gordo et al. |
| 2012/0045134 A1 | 2/2012 | Perronnin et al. |
| 2012/0076401 A1 | 3/2012 | Sanchez et al. |
| 2012/0143853 A1 | 6/2012 | Gordo et al. |
| 2013/0064444 A1 | 3/2013 | Gordo et al. |
| 2013/0290222 A1 | 10/2013 | Gordo et al. |

OTHER PUBLICATIONS

De Campos, et al. "Images as sets of locally weighted features" CVIU, 116(1), 2012, pp. 68-85.*
Angelova, et al. "Efficient object detection and segmentation for fine-gradient recognition" CVPR, Jun. 23-28, 2013, pp. 811-818.
Arandjelovic, et al. "All about VLAD" CVPR, 2013, pp. 1578-1585.
Berg, et al. "POOF: Part-based One-vs-One Features for fine-grained categorization, face verification, and attribute estimation" CVPR, 2013, pp. 955-962.

(Continued)

*Primary Examiner* — Kim Vu
*Assistant Examiner* — Fred Hu
(74) *Attorney, Agent, or Firm* — Fay Sharpe LLP (57) ABSTRACT

A method for generating an image representation includes generating a set of embedded descriptors, comprising, for each of a set of patches of an image, extracting a patch descriptor which is representative of the pixels in the patch and embedding the patch descriptor in a multidimensional space to form an embedded descriptor. An image representation is generated by aggregating the set of embedded descriptors. In the aggregation, each descriptor is weighted with a respective weight in a set of weights, the set of weights being computed based on the patch descriptors for the image. Information based on the image representation is output. At least one of the extracting of the patch descriptors, embedding the patch descriptors, and generating the image representation is performed with a computer processor.

18 Claims, 5 Drawing Sheets

(56) References Cited

OTHER PUBLICATIONS

Bo, et al. "Efficient match kernel between sets of features for visual recognition" NIPS, 2009, pp. 135-143.
Boureau, et al. "A theoretical analysis of feature pooling in visual recognition" ICML, 2010, pp. 111-118.
Chatfield, et al. "The devil is in the details: an evaluation of recent feature encoding methods" BMVC, 2011, pp. 1-12.
Cinbis, et al. "Image categorization using Fisher kernels of non-iid image models" CVPR, 2012, pp. 2184-2191.
Clinchant, et al. "XRCEs participation to imageval" ImageEval Workshop at CVIR, 2004, pp. 1-8.
Csurka, et al. "Visual categorization with bags of keypoints" ECCV SLCV workshop, 2004, pp. 1-16.
Le Cun, et al. "Handwritten digit recognition with a back-propagation network" NIPS, 1989, pp. 1-9.
Delhumeau, et al. "Revisiting the vlad image representation" ACM MM, 2013, pp. 653-656.
Everingham, et al. "The PASCAL Visual Object Classes (VOC) Challenge" Int. J. Comput. Vis. (2010) 88:303-338.
Fukushima, et al. "Neocognitron: a new algorithm for pattern recognition tolerant of deformations and shifts in position" Pattern Recognition, 15(6), 1982, pp. 455-469.
Jebara, et al. "Probability product kernels" Journal of Machine Learning Research (JMLR) 2004, pp. 819-844.
Jegou, et al. "On the burstiness of visual elements" CVPR, 2009, pp. 1169-1176.
Jegou, et al. "Aggregating local image descriptors into compact codes" IEEE Trans. Pattern Anal. Mach. Intell. (TPAMI), 34(9), 2012, pp. 1704-1716.
Jia, et al. "Beyond spatial pyramids: Receptive field learning for pooled image features" CVPR, 2012, pp. 3370-3377.
Lazebnik, et al. "Beyond bags of features: Spatial pyramid matching for recognizing natural scene categories" CVPR, 2006, pp. 2169-2178.
Lee, et al. "Convolutional deep belief networks for scalable unsupervised learning of hierarchical representations" Proc. 26$^{th}$ Annual Intern'l Conf. on Machine Learning (ICML), 2009, pp. 609-616.
Lowe, et al. "Distinctive image features from scale-invariant keypoints" IJCV, 2004, pp. 1-28.
Nilsback, et al. "Automated Flower classification over a large number of classes" ICCVGIP 2008, pp. 722-729.
Parkhi, et al. "Cats and dogs" CVPR, 2012, pp. 3498-3505.
Perronnin, et al. "Fisher kernels on visual vocabularies for image categorization" CVPR, 2007, pp. 1-8.
Perronnin, et al. "Large-scale image retrieval with compressed fisher vectors" CVPR, 2010, pp. 3384-3391.
Perronnin, et al. Large-scale image categorization with explicit data embedding CVPR, pp. 3384-3391, (2010).
Perronnin, et al. "Improving the fisher kernel for large-scale image classification" CVPR, 2010, pp. 143-156.
Pinto, et al. Why is real-world visual object recognition hard? PLoS Computational Biology, 4(1):e27, Jan. 2008, pp. 0151-0156.
Ranzato, et al. "Sparse feature learning for deep belief networks" NIPS, 2007, pp. 20-27.
Riesenhuber, et al. "Hierarchical models of object recognition in cortex" Nature Neuroscience, 1999, pp. 1019-1025.
Rodriguez, et al. "Predicting an object location using a global image representation" ICCV, 2013, pp. 1-8.
Sanchez, et al. "Image classification with the fisher vector: theory and practice" IJCV, 2013, pp. 222-245.
Serre, et al. "Object recognition with features inspired by visual cortex" CVPR, 2005, pp. 994-1000.
Sivic, et al. "Video Google: A text retrieval approach to object matching in videos" ICCV, 2003, pp. 1-8.
Torii, et al. "Visual place recognition with repetitive structures" CVPR, 2013, pp. 883-890.
Wah, et al. The Caltech-UCSD Birds-200-2011 Dataset, Technical Report CNS-TR-2011-001, Caltech, 2011, pp. 1-8.
Welinder, et al. "Caltech-UCSD Birds 200" Technical Report CNS-TR-2010-001, 2010, pp. 1-15.
Yang, et al. "Linear Spatial pyramid matching using sparse coding for image classification" CVPR, 2009, pp. 1794-1801.
Zhou, et al. "Image classification using super-vector coding of local image descriptors" ECCV (5), 2010, pp. 141-154.

* cited by examiner

WEIGHTING SCHEME FOR POOLING IMAGE DESCRIPTORS

BACKGROUND

The exemplary embodiment relates to image representation, for tasks such as classification and retrieval, and finds particular application in a system and method for aggregating encoded local descriptors using a pooling function which allows more weight to be placed on local descriptors that are less frequently occurring in the pool of descriptors.

Conventional image classification methods include extracting patches from the image and generating a representation of each patch, called a local descriptor or patch descriptor. The patch descriptors (such as SIFT or color descriptors) are then encoded using an embedding function $\phi$ that maps the descriptors in a non-linear fashion into a higher-dimensional space to form embedded patch descriptors. The embedded descriptors are then aggregated into a fixed-length vector or image representation using a pooling function. Representations of this type include the Bag-Of-Visual-words (BOV) (see, G. Csurka, et al., "Visual categorization with bags of keypoints," ECCV SLCV workshop 2004, hereinafter, Csurka 2004; J. Sivic, et al., "Video Google: A text retrieval approach to object matching in videos," ICCV 2003, and U.S. Pub. No. 20080069456), the Fisher Vector (FV) (see, F. Perronnin, et al., "Fisher kernels on visual vocabularies for image categorization," CVPR 2007, hereinafter, Perronnin 2007, and U.S. Pub. Nos. 20070005356 and 20120076401), the Vector of Locally Aggregated Descriptors (VLAD) (see, H. Jégou, et al., "Aggregating local image descriptors into compact codes," TPAMI 2012, hereinafter, Jégou 2012), the Super Vector (SV) (see, Z. Zhou, et al., "Image classification using super-vector coding of local image descriptors," ECCV 2010 hereinafter, Zhou 2010) and the Efficient Match Kernel (EMK) (see, L. Bo, et al., "Efficient match kernel between sets of features for visual recognition," NIPS 2009, hereinafter, Bo 2009).

Pooling is the operation which involves aggregating several patch embeddings into a single representation. While pooling achieves some invariance to perturbations of the descriptors, it may lead to a loss of information. To reduce this loss as much as possible, only close descriptors should be pooled together. To enforce the pooling of close descriptors in the geometric space, it is possible to use spatial pyramids (see, S. Lazebnik, et al., "Beyond bags of features: Spatial pyramid matching for recognizing natural scene categories," CVPR, 2006). In the descriptor space, the closeness constraint is achieved through the choice of an appropriate embedding $\phi$.

Pooling is typically achieved by either averaging/summing or by taking the maximum response. A common pooling mechanism involves averaging the descriptor embeddings (see, Csurka 2007, Perronnin 2007, Jégou 2012, Zhou 2010, and Bo 2009). Given a set of patch descriptors $\{x_1, \ldots, x_M\}$, the average-pooled representation is simply $$\frac{1}{M}\sum_{i=1}^{M} \varphi(x_i).$$

An advantage of average pooling is its generality, since it can be applied to any embedding. A disadvantage of this method, however, is that frequent descriptors will be more influential in the final representation than rarely-occurring ones. By "frequent descriptors" it is meant descriptors which, although not necessarily identical, together form a mode in descriptor space. However, such frequently-occurring descriptors are not necessarily the most informative ones.

As an example, consider a fine-grained classification task where the goal is to distinguish bird species. In a typical bird image, most patches might correspond to background foliage or sky and therefore carry little information about the bird class. On the other hand, the most discriminative information might be highly localized and therefore correspond to only a handful of patches. Hence, it is desirable to ensure that even those rare patches contribute significantly to the final representation.

The problem of reducing the influence of frequent descriptors has received a great deal of attention in computer vision. This issue can be addressed at the pooling stage or a posteriori by performing some normalization on the image-level pooled descriptor. Several approaches have been proposed to address the problem of frequent descriptors at the pooling stage. However, all of these solutions are heuristic in nature and/or limited to certain types of embeddings. For example, one approach, referred to as max pooling (see, Y.-L. Boureau, et al., "A theoretical analysis of feature pooling in visual recognition," ICML 2010) is only applicable when applied to descriptor embeddings which can be interpreted as counts, as is the case of the BOV. It is not directly applicable to those representations which compute higher-order statistics, such as the FV, the VLAD, the SV or the EMK.

Several extensions to the standard average and max pooling frameworks have been proposed. For example, a smooth transition from average to max pooling can be considered. It is also possible to add weights to obtain a weighted pooling (see, T. de Campos, et al., "Images as sets of locally weighted features," CVIU, 116 (1), pp. 68-85 (2012) (de Campos 2012)). The weights in de Campos 2012 are computed from a separate saliency model to attempt to cancel-out the influence of irrelevant descriptors, but such a model may not necessarily equalize the influence of frequent and rare descriptors.

There remains a need for a pooling method which is generic and applicable to all aggregation-based representations.

INCORPORATION BY REFERENCE

The following references, the disclosures of which are incorporated herein in their entireties, by reference, are mentioned: U.S. Pub. No. 2007005356, published Jan. 4, 2007, entitled GENERIC VISUAL CATEGORIZATION METHOD AND SYSTEM, by Florent Perronnin; U.S. Pub. No. 20070258648, published Nov. 8, 2007, entitled GENERIC VISUAL CLASSIFICATION WITH GRADIENT COMPONENTS-BASED DIMENSIONALITY ENHANCEMENT, by Florent Perronnin; U.S. Pub. No. 20080069456, published Mar. 20, 2008, entitled BAGS OF VISUAL CONTEXT-DEPENDENT WORDS FOR GENERIC VISUAL CATEGORIZATION, by Florent Perronnin; U.S. Pub. No. 20090144033, published Jun. 4, 2009, entitled OBJECT COMPARISON, RETRIEVAL, AND CATEGORIZATION METHODS AND APPARATUSES, by Yan Liu, et al.; U.S. Pub. No. 20100092084, published Apr. 15, 2010, entitled REPRESENTING DOCUMENTS WITH RUNLENGTH HISTOGRAMS, by Florent Perronnin, et al.; U.S. Pub. No. 20100098343, published Apr. 22, 2010, entitled MODELING IMAGES AS MIXTURES OF IMAGE MODELS, by Florent Perronnin, et al.; U.S. Pub. No. 20100189354, published Jul. 29, 2010, entitled MODELING IMAGES AS SETS OF WEIGHTED FEATURES, by Teofilo E. de Campos, et al.; U.S. Pub. No. 20100191743, published Jul. 29, 2010, entitled CONTEXTUAL SIMILARITY MEASURES FOR OBJECTS AND RETRIEVAL, CLASSIFICATION, AND CLUSTERING USING SAME, by Florent Perronnin, et al.; U.S. Pub. No. 20100318477, published Dec. 16, 2010, entitled FAST AND EFFICIENT NONLINEAR CLASSIFIER GENERATED FROM A TRAINED LINEAR CLASSIFIER, by Florent Perronnin, et al., U.S. Pub. No. 20110026831, published Feb. 3, 2011, entitled COMPACT SIGNATURE FOR UNORDERED VECTOR SETS WITH APPLICATION TO IMAGE RETRIEVAL by Florent Perronnin, et al.; U.S. Pub. No. 20110040711, published Feb. 17, 2011, entitled TRAINING A CLASSIFIER BY DIMENSION-WISE EMBEDDING OF TRAINING DATA, by Florent Perronnin, et al.; U.S. Pub. No. 20110091105, published Apr. 21, 2011, entitled BAGS OF VISUAL CONTEXT-DEPENDENT WORDS FOR GENERIC VISUAL CATEGORIZATION, by Florent Perronnin; U.S. Pub. No. 20110137898, published Jun. 9, 2011, entitled UNSTRUCTURED DOCUMENT CLASSIFICATION, by Albert Gordo, et al.; U.S. Pub No. 20120045134, published Feb. 23, 2012, entitled LARGE SCALE IMAGE CLASSIFICATION, by Florent Perronnin, et al.; U.S. Pub No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al., U.S. Pub. No. 20120143853, published Jun. 7, 2012, entitled LARGE-SCALE ASYMMETRIC COMPARISON COMPUTATION FOR BINARY EMBEDDINGS, by Albert Gordo, et al.; U.S. Pub. No. 20130064444, published Mar. 14, 2013, entitled DOCUMENT CLASSIFICATION USING MULTIPLE VIEWS, by Albert Gordo, et al.; and U.S. Pub. No. 20130290222, published Oct. 31, 2013, entitled RETRIEVAL SYSTEM AND METHOD LEVERAGING CATEGORY-LEVEL LABELS, by Albert Gordo, et al.

BRIEF DESCRIPTION

In accordance with one aspect of the exemplary embodiment, a method for generating an image representation includes generating a set of embedded patch descriptors, including for each of a set of patches of an image, extracting a patch descriptor which is representative of the pixels in the patch and embedding the patch descriptor in a multidimensional space to form an embedded patch descriptor. An image representation is generated. This includes aggregating the set of embedded patch descriptors. In the aggregation, each descriptor is weighted with a respective weight in a set of weights, the set of weights being computed based on the embedded patch descriptors for the image. Information based on the image representation is output.

In another aspect, a system for generating an image representation includes a descriptor extractor which extracts a set of patch descriptors, each patch descriptor being representative of the pixels in a patch of an image. An embedding component embeds each of the patch descriptors in a multidimensional space to form a respective embedded descriptor. A pooling component aggregates the set of embedded descriptors. In the aggregation, each patch descriptor is weighted with a respective weight in a set of weights, the set of weights being computed based on the embedded patch descriptors for the image. A processor implements the descriptor extractor, embedding component, and pooling component.

In another aspect, a method for generating an image representation includes for each of a set of M patches of an image, extracting a patch descriptor which is representative of the pixels in the patch and embedding the patch descriptor in a multidimensional space with an embedding function to form a D-dimensional embedded descriptor. With a processor, an aggregated representation of the image is generated. This includes aggregating the embedded descriptors as $\Psi = \sum_{i=1}^{M} w_i \phi(x_i)$, where $\Psi$ is the aggregated representation, $\phi(x_i)$ represents one of the M embedded patch descriptors and $w_i$ represents a respective weight, the weights being selected by one of:

a) finding a vector $w=[w_1, \ldots, w_M]$ that minimizes the expression:

$$\|\Phi^T \Phi w - c_M\|^2 + \lambda \|w\|^2$$

where $\Phi$ is a D×M matrix that contains the D-dimensional embedded patch descriptors, $c_M$ is a vector in which all values are a same constant value, and $\lambda$ is a non-negative regularization parameter; and b) finding the aggregated representation $\Psi$ that minimizes the expression:

$$\|\Phi^T \Psi - c_M\|^2 + \lambda \|\Psi\|^2 \qquad \text{(Eqn. 11)},$$

where $\Phi$ is a D×M matrix that contains the D-dimensional embedded patch descriptors, $c_M$ is a vector in which all values are all a same constant value, and $\lambda$ is a non-negative regularization parameter. An image representation based on the aggregated representation $\Psi$ is generated.

DETAILED DESCRIPTION

Aspects of the exemplary embodiment relate to a system and method for generating an image representation which uses a weighted pooling method for aggregation of embedded patch descriptors (also referred to as patch embeddings). The pooling method is applicable to a variety of embedding methods. When the BOV embedding function is used, the pooling method results in a max pooling and is thus referred to herein as generalized max pooling (GMP).

This approach allows a set w of weights to be chosen to linearly reweight the embedded patch descriptors such that the locations of the modes of their distribution will be the same, while the heights of their modes may be different. Therefore, rather than attempting to flatten the overall distribution, the method flattens the likelihood of each sample.

Figure 1:
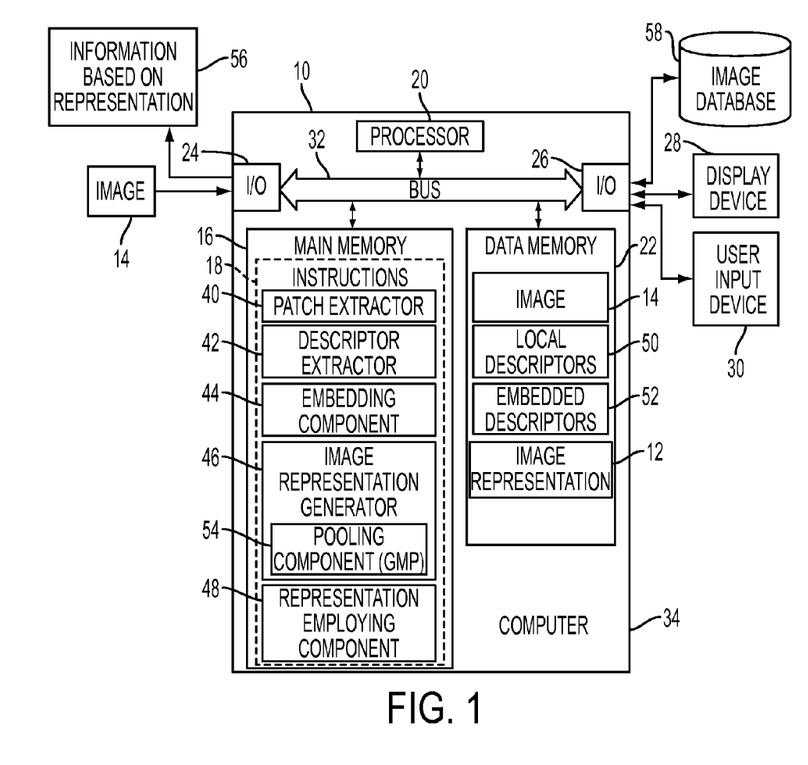
FIG. 1 is a functional block diagram of a system for computing a representation of an image.

With reference to FIG. 1, a system 10 for generating an image representation 12 of an input image 14, such as a photographic image, is illustrated. The system takes as input an image 14 for which a statistical representation 12, such as a fixed length vector, is desired.

The illustrated system includes main memory 16 which stores instructions 18 for generating the representation and a processor 20, in communication with the memory, for executing the instructions. Data memory 22 stores the input image 14 during processing as well as information generated during the processing of the image. One or more network interface (I/O) devices 24, 26 allow the system to communicate with external devices, such as a source of the image (not shown), a display device 28, such as a computer monitor or LCD screen, and a user input device 30, such as a keyboard, keypad, touch screen cursor control device, or combination thereof. Hardware components of the system may be communicatively connected by a data/control bus 32. The system may be hosted by one or more computing devices 34.

The illustrated instructions include a patch extractor 40, a descriptor extractor 42, an embedding component 44, an image representation generator 46, and a representation employing component 48. Briefly, the patch extractor 40 extracts a set of patches from the image, e.g., patch comprising a set of pixels. The descriptor extractor 42 generates a patch descriptor 50 based on the pixels of the respective patch. The embedding component 44 embeds the patch descriptor into an embedding space using an embedding function $\phi$, generating an embedded descriptor 52 for each patch. In the case of BOV, the embedding function may include assigning the patch descriptor to the closest visual word in a set of visual words (or codebook), where each of the visual words represents a centroid of a cluster of patch descriptors extracted from a set of training images. The image representation generator 46 includes a weighted pooling (GMP) component 54 which aggregates the embedded descriptors 52 to form an aggregation (denoted $\Psi$) which can serve as image representation 12, or be first normalized or otherwise processed to form the image representation 12. The representation employing component 48 uses the representation 12, for example, for classification of the image or for image retrieval.

Information 56 is output by the system, based on the image representation. The information 56 may include the representation 12 itself, a classification for the image, a set of similar images retrieved from an associated image database 58, combination thereof, or the like.

The computer system 10 may include one or more computing devices, such as a PC, such as a desktop, a laptop, palmtop computer, portable digital assistant (PDA), server computer, cellular telephone, tablet computer, pager, combination thereof, or other computing device capable of executing instructions for performing the exemplary method.

The memory 16 may represent any type of non-transitory computer readable medium such as random access memory (RAM), read only memory (ROM), magnetic disk or tape, optical disk, flash memory, or holographic memory. In one embodiment, the memory 16 comprises a combination of random access memory and read only memory. In some embodiments, the processor 12 and memory 14 may be combined in a single chip. Memory 16 stores instructions for performing the exemplary method as well as the processed data 12, 50, 52.

The network interface 24, 26 allows the computer to communicate with other devices via a computer network, such as a local area network (LAN) or wide area network (WAN), or the internet, and may comprise a modulator/demodulator (MODEM) a router, a cable, and and/or Ethernet port.

The digital processor 20 can be variously embodied, such as by a single-core processor, a dual-core processor (or more generally by a multiple-core processor), a digital processor and cooperating math coprocessor, a digital controller, or the like. The digital processor 20, in addition to controlling the operation of the computer 34, executes the instructions 18 stored in memory 16 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10. Since the configuration and operation of programmable computers are well known, they will not be described further.

Figure 2:
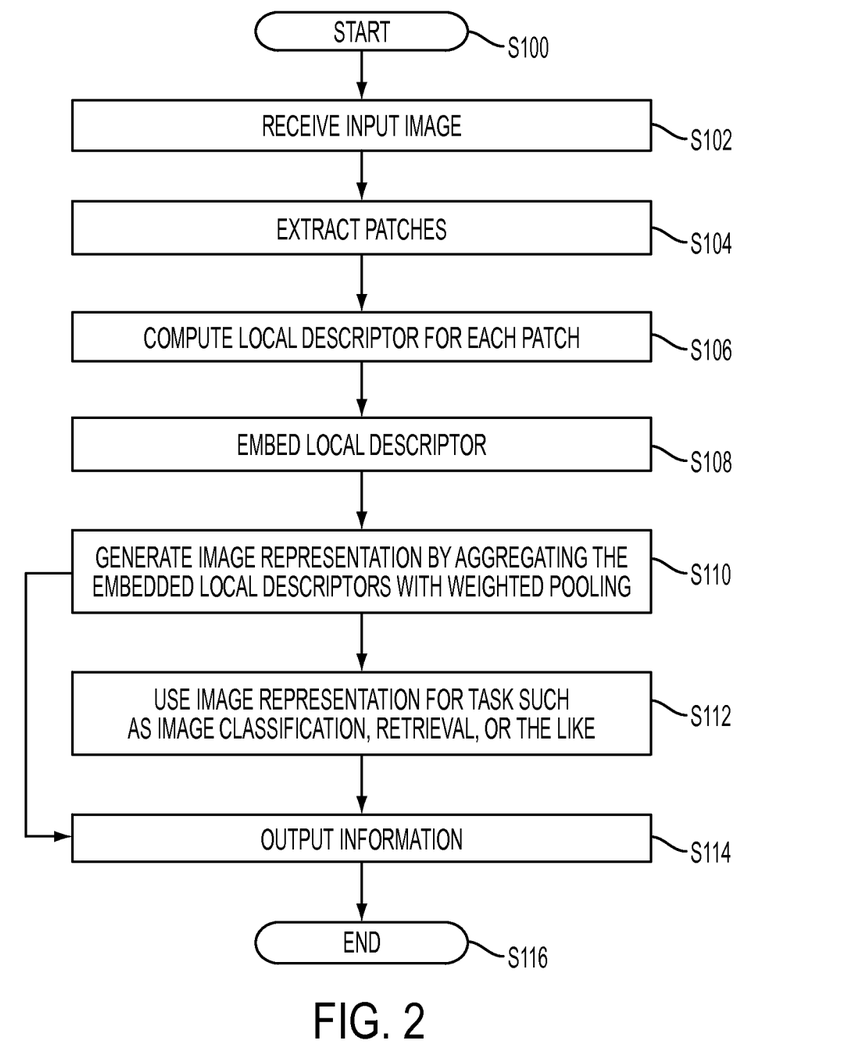
FIG. 2 is a flow chart illustrating a method for computing a representation of an image.

FIG. 2 illustrates a method for generating an image representation. The method begins at S100. At S102, an input image is received by the system, either from an external device, or from internal memory of the computing device 34. At S104, patches are extracted from the image by the patch extractor 40. At S106, a patch descriptor is extracted from each patch by the descriptor extractor 42. At S108, each patch descriptor is embedded using an embedding function to form an embedded patch descriptor.

At S110, the embedded patch descriptors are aggregated using weighted pooling (GMP) to form an image representation. Further details of this step are discussed below.

At S112, the image representation 12 may be used in a task, such as classification or retrieval, by the representation employing component 48. To compute similarity between images, a kernel K(X, Y) may be computed as a dot-product between the GMP representations of two images. To classify the image, a classifier trained with image representations formed by the present GMP method may be used.

At S114, information 56 is output, such as the image representation, a class label for the image, or a set of images with similar image representations. The method ends at S116.

The weighted pooling (GMP) component 54 employs a pooling mechanism that involves re-weighting the per-patch statistics (the descriptor embeddings). It achieves the same equalization effect as max pooling but is applicable beyond the BOV and especially to the Fisher Vector. It therefore provides a generalized tool for Max Pooling. In the Examples below, the weighted pooling approach is shown to perform on par with, and sometimes significantly better than, heuristic alternatives. The exemplary GMP approach thus addresses the frequent descriptors discussed above (descriptors which are close together and form a mode in descriptor space) in a way that is applicable to any descriptor embedding, not just those which can be interpreted as counts.

Figure 3:
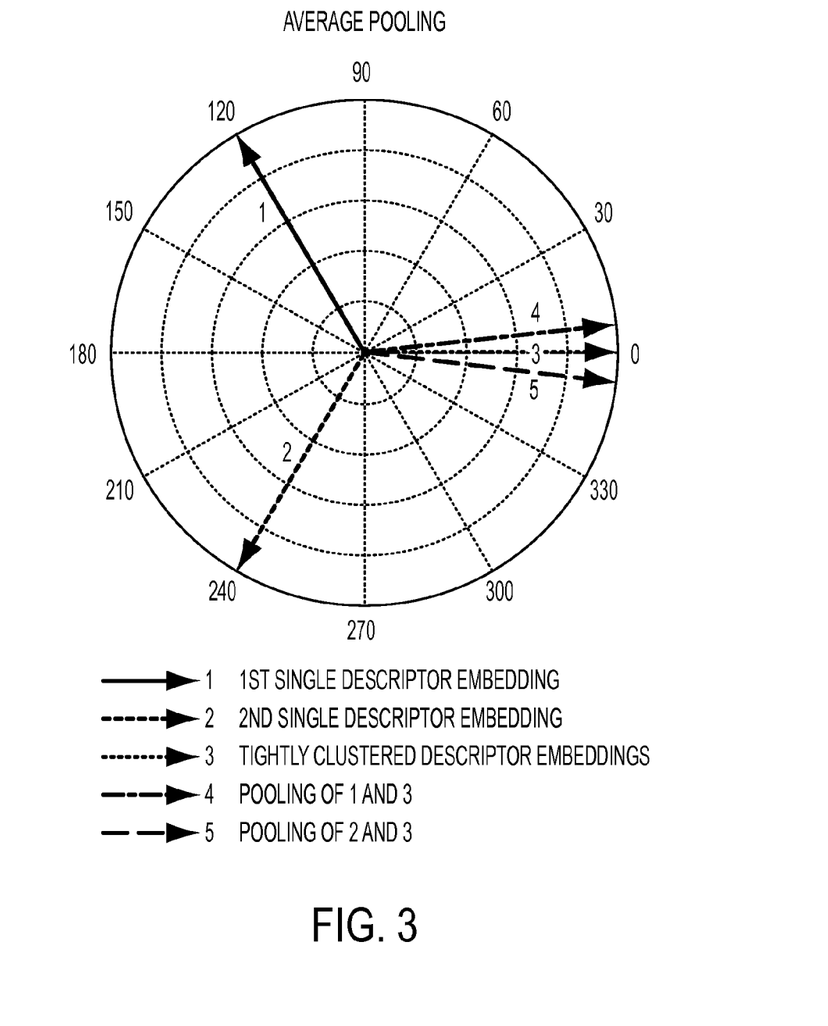
FIG. 3 illustrates the effect of pooling a single descriptor embedding with a set of tightly-clustered descriptor embeddings using average pooling.
Figure 4:
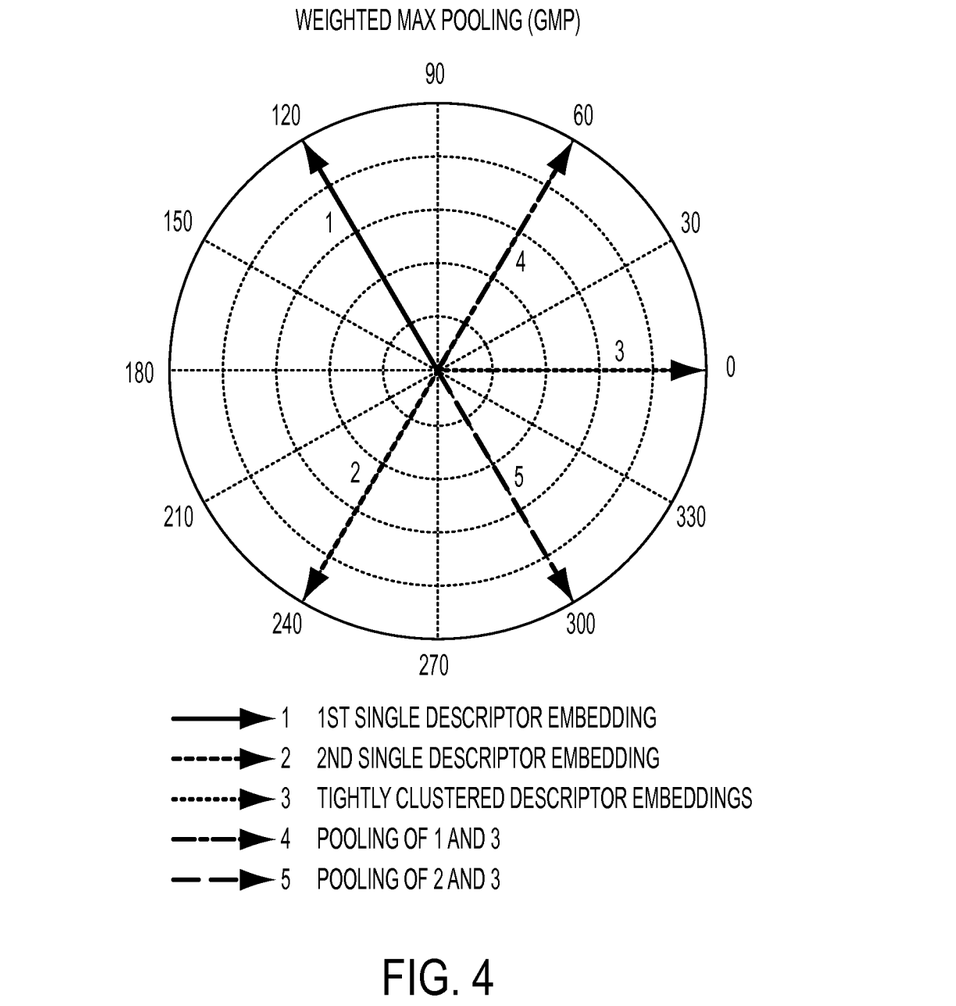
FIG. 4 illustrates the effect of pooling a single descriptor embedding with a set of tightly-clustered descriptor embeddings using weighted pooling (GMP)

FIGS. 3 and 4 illustrate the effect of pooling a single descriptor embedding with a set of tightly-clustered descriptor embeddings. Two pooled representations are shown. With average pooling (FIG. 3), the cluster of descriptors dominates the pooled representations, and as a result they are very similar to each other. With the present GMP approach (FIG. 4), both descriptors contribute meaningfully, resulting in highly distinguishable pooled representations.

The weights used to reweight the descriptor embeddings are computed on a per-image basis to equalize the influence of frequent and rare embedded descriptors.

Let $w_i$ denote the weight associated with descriptor $x_i$, a weighted representation $\Psi$ of the image can be represented as the sum, over all the M descriptors, of the product of the weight for the descriptor and the embedded descriptor:

$$\Psi = \sum_{i=1}^{M} w_i \phi(x_i).$$

An advantage of this approach is that there is no need to quantize the descriptors in order to detect frequent descriptors (as is done, for example in the case of BOV representations). As a consequence, the weighting is general and can be applied in combination with any embedding function. For example, it is applicable to codebook-free representations such as the EMK and to representations based on higher-order statistics, such as the FV.

A criterion to compute the weights $w_i$ is based on a kernel matrix of descriptor-to-descriptor similarities. In one embodiment, the patch weights are first computed and then the weighted embeddings are combined. In another embodiment, the weighted representation can be computed directly and efficiently using a least-squares formulation. The exemplary GMP mechanism, in the case of the BOV, produces the same result as max-pooling.

In the following, the terms "optimization", "minimization", and similar phraseology are to be broadly construed as one of ordinary skill in the art would understand these terms. For example, these terms are not to be construed as being limited to the absolute global optimum value, absolute global minimum, or so forth. For example, minimization of a function may employ an iterative minimization algorithm that terminates at a stopping criterion before an absolute minimum is reached. It is also contemplated for the optimum or minimum value to be a local optimum or local minimum value.

A. Reweighting Framework

Let $X=\{x_1, \ldots, x_M\}$ and $Y=\{y_1, \ldots, x_N\}$ denote two sets of patch descriptors extracted from two images. Let $$\Psi_X = \frac{1}{M} \sum_{i=1}^{M} \varphi(x_i)$$

and let $$\Psi_Y = \frac{1}{N} \sum_{j=1}^{N} \varphi(y_j)$$

denote the average-pooled representations for these images. The dot-product $K(X, Y) = \Psi_X^T \Psi_y$ can be rewritten as a Sum Match Kernel (SMK), as follows:

$$K(X, Y) = \frac{1}{MN} \sum_{i=1}^{M} \sum_{j=1}^{N} k(x_i, y_j), \quad (1)$$

where $k(x_i, y_j) = \phi(x_i)^T \phi(y_j)$ is, by definition, a Positive Semi Definite (PSD) kernel and T represents the transpose operator.

For example, in the BOV case, $\phi(x)$ is a binary vector whose dimension is equal to the codebook size and with a single non-zero entry at the index of the closest centroid to descriptor x. In this case, $k(x, y)=1$ if x and y fall in the same Voronoi region and 0 otherwise.

As another example, if k is the Gaussian kernel $$k_\sigma(x, y) \propto \exp\left(-\frac{\|x-y\|^2}{2\sigma^2}\right),$$

the SMK is referred to as the Gaussian Match Kernel (GMK). In such a case, the embedding $\phi$ is obtained by combining random projections with cosine non-linearities, thus leading to the EMK (see, Bo 2009).

In the following discussion, the GMK is used by way of example. This is because the GMK has a probabilistic interpretation that is leveraged to develop the re-weighting scheme. A criterion to compute the weights that depends only on the kernel k between individual descriptors and not on the embedding $\phi$ of individual descriptors is described. A criterion to compute the weights that depends only on the embedding $\phi$ of individual descriptors and not on the kernel k between individual descriptors is then described which is interpretable in a non-probabilistic setting (referred to as the Direct Solution). Therefore, the weight computation algorithm discussed can be extrapolated to any PSD kernel k even if it does not have a probabilistic interpretation.

1. Probability Product Kernels

From the two sets X and Y, two Kernel Density Estimators (KDEs) can be derived:

$$p(x) = \frac{1}{M} \sum_{i=1}^{M} k_{\frac{\sigma}{\sqrt{2}}} k_{\frac{\sigma}{\sqrt{2}}}(x, x_i) \text{ and } q(x) = \frac{1}{N} \sum_{j=1}^{N} k_{\frac{\sigma}{\sqrt{2}}}(x, y_j).$$

Given two probability distributions p and q, the Probability Product Kernel (PPK) (see, T. Jebara, et al., "Probability product kernels." JMLR, pp. 819-844 (2004)) measures their similarity:

$$K_{ppk}^\rho(p,q) = \int p(x)^\rho q(x)^\rho dx, \quad (2)$$

where $\rho$ is a parameter of the kernel. When $\rho=1$, the PPK is known as the expected likelihood kernel and $\rho=\frac{1}{2}$ leads to the Bhattacharyya kernel. The GMK between X and Y can be written as a PPK between p and q:

$$K_{ppk}^1(p, q) = \frac{1}{MN} \sum_{i=1}^{M} \sum_{j=1}^{N} \int k_{\frac{\sigma}{\sqrt{2}}}(x, x_i) k_{\frac{\sigma}{\sqrt{2}}}(x, y_j) dx \propto \quad (3)$$

$$\frac{1}{MN}\sum_{i=1}^{M}\sum_{j=1}^{N} k_\sigma(x_i, y_j) = K_{gmk}(X, Y).$$

Figure 5:
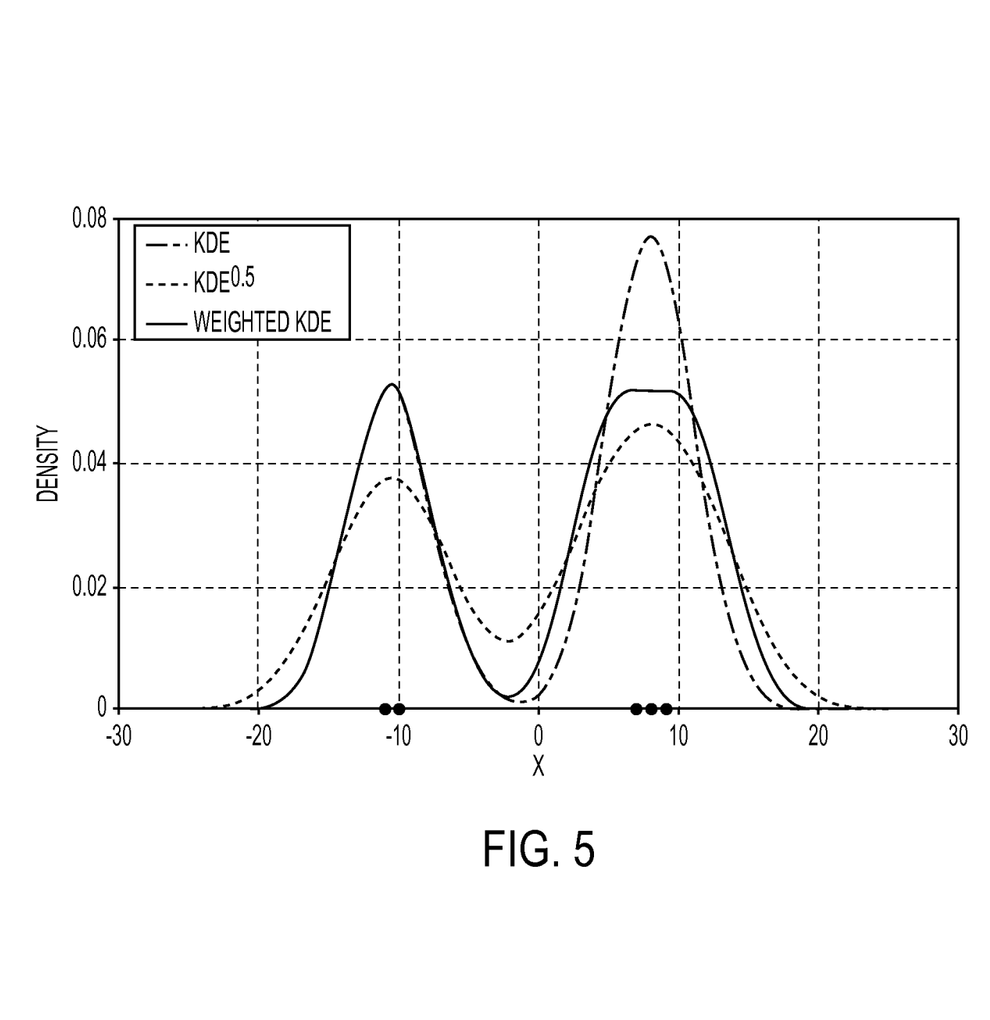
FIG. 5 illustrates probability distributions formed by KDE with no weights (KDE), after exponentiation to the power $\rho=0.5$ and renormalization ($KDE^{0.5}$), and with weights computed with the proposed approach (weighted KDE). The KDEs were generated using 5 1-dimensional observations (marked as black dots in the plot) with values [−11, −10, 7, 8, 9].

This probabilistic view of the GMK provides a way to visualize the impact of similar descriptors. Indeed, a group of similar descriptors in X, will lead to a mode in the distribution p. FIG. 5 illustrates this effect, showing two groups of descriptors leading to a bi-modal probability distribution. One solution to lessen the effect of frequent descriptors is to choose values ρ<1 in the PPK as depicted in FIG. 5. However, this solution faces two major problems. First, for ρ<1, the PPK between two KDEs can no longer be reduced to a SMK. In such a case the costly kernel K(X, Y) cannot be rewritten as an efficient dot-product. In the present method, being able to write K as a dot-product between pooled representations is advantageous because it enables efficient linear classifiers on these representations to be learned. Second, to perfectly equalize the modes, it would be necessary to set ρ→0. In such a case, $p^\rho$ becomes flat and therefore uninformative.

2. Weighted Pooling

To treat the issue of frequently-occurring descriptors, the exemplary method re-weights their embeddings. For each descriptor $x_i$, a weight $w_i$ is learned and the weighted-pooled representation is a function of $\Sigma_{i=1}^{M} w_i \phi(x_i)$. This has two major advantages with respect to the power alternative discussed above. First, the kernel K(X, Y) can still be expressed as a dot-product between GMP representations, facilitating classification. Second, we can equalize the modes without flattening the whole distribution.

Instead of exactly equalizing the modes, which would entail first detecting the modes, which is a costly process, the exemplary method equalizes the distribution at the position of each sample $x_i$. As shown in FIG. 4, this has a similar effect (see "weighted KDE"). That is, given a set of samples $X=\{x_1, \ldots, x_M\}$, a vector of weights $w=[w_1, \ldots, w_M]$ is learned such that the sum over all patch descriptors $x_j$ (including $x_i$) of a weighted kernel between the descriptor $x_i$ and the other descriptor $x_j$ equals a constant value c:

$$\Sigma_{j=1}^{M} w_j k_\sigma(x_i,x_j)=c \text{ for } i=1 \ldots M \qquad (4)$$

where c is a constant value. Note that the resulting weighted function is not necessarily a distribution in the sense that $\Sigma_{i=1}^{M} w_i$ may not sum to one. However, the final image representation can be $l_2$-normalized. This is consistent with the dot-product similarity (allowing use of linear kernel machines for classification) as this enforces an image to be closest to itself. This has also been shown to improve results (see, F. Perronnin, J. Sánchez, and T. Mensink, "Improving the fisher kernel for large-scale image classification," ECCV, pp. 143-156 (2010), hereinafter, Perronnin 2010). Therefore, it is only of interest to compute w up to a multiplicative factor and the value c=1 can be arbitrarily chosen.

Then, let K be the M×M kernel matrix between individual elements $x_i$ and the M×1 vector of weights, w, and let $1_M$ represent the M×1 vector of all ones, equation (4) can be rewritten as:

$$Kw=1_M. \qquad (5)$$

i.e., the product of the M×M kernel matrix K and the vector of weights w equals a vector in which each element has a value of 1. (The value 1 may be replaced by another other constant same value c, to produce a vector $c_M$). Note that equation (5) (which only depends on k) is generic and can be applied to any PSD kernel k. However, there are two major limitations of this dual formulation. First, its interpretability is unclear when it is applied beyond the GMK since there is generally not a probabilistic interpretation of SMKs. Second, it requires computing the distance between all pairs of patch descriptors. This would be computationally costly when extracting tens of thousands of patch descriptors, as is often the case.

3. Direct Solution for Eqn. 5

An alternative formulation of equation (5) is now given which only depends on the embedded descriptors $\phi(x_i)$. Since K is a PSD matrix, it can be rewritten as:

$$K=\Phi^T\Phi, \qquad (6)$$

where $\Phi$ is the D×M matrix that contains the D-dimensional patch embeddings: $\Phi=[\phi(x_1), \ldots, \phi(x_M)]$. Hence equation (5) is rewritten as:

$$\Phi^T\Phi w=1_M. \qquad (7)$$

where $\Psi=\Phi w$ and $\Psi=\Sigma_{i=1}^{M} w_i \phi(x_i)$, i.e., $\Psi$ is the GMP representation to be computed. Therefore, the method finds $\Psi$ that optimizes:

$$\Phi^T\Psi=1_M. \qquad (8)$$

An advantage of this formulation is that it offers a matching interpretation: matching a single patch embedding $\phi(x_i)$ with the weighted representation $\Psi$ should result in a similarity equal to 1, for all descriptors $x_i$. Another advantage is that, instead of first computing a set of weights and then combining the per-patch embeddings, the weighted image representation can be computed directly. In general, equation (8) might not have a solution or it might have multiple solutions. Therefore, Eqn. (8) is converted to a least-squares regression problem and the method seeks the value of $\Psi$, denoted $\Psi^*$, which minimizes the $l_2$ norm of $\Phi^T\Psi-1_M$:

$$\Psi^* = \operatorname*{argmin}_{\Psi} \|\Phi^T\Psi - 1_M\|^2, \qquad (9)$$

with the additional constraint that $\Psi^*$ has a minimal norm in the case of an infinite number of solutions. Other norms are alternatively used. Eqn. (9) admits a simple closed-form solution:

$$\Psi^*=(\Phi^T)^+ 1_M=(\Phi\Phi^T)^+\Phi 1_M, \qquad (10)$$

where $^+$ denotes the pseudo-inverse and the second equality stems from the property $A^+=(A^TA)^+A^T$. Note that $\Phi 1_M=\Sigma_{i=1}^{M}\phi(x_i)$ is the sum-pooled vector of embeddings which is equivalent to the average-pooled vectors since the final image descriptors are $l_2$-normalized. Hence, the exemplary weighted pooling (GMP) mechanism involves projecting the average-pooled vector $\Phi 1_M$ on $(\Phi\Phi^T)^+$.

Since the pseudo-inverse is not a continuous operation, it is generally beneficial to add a regularization term to obtain a stable solution for $\Psi$. Let this regularized GMP representation be denoted $\Psi^*_\lambda$:

$$\Psi^*_\lambda = \operatorname*{argmin}_{\Psi} \|\Phi^T\Psi - 1_M\|^2 + \lambda\|\Psi\|^2. \qquad (11)$$

where the second term is the regularization term and $\lambda$ is a regularization parameter, which in the exemplary embodiment, is non-negative and/or non-zero. Eqn. (11) is a ridge regression problem whose solution is:

$$\Psi^*_\lambda = (\Phi\Phi^T \lambda I)^{-1} \Phi 1_M. \tag{12}$$

where I is the identity matrix. $\lambda$ can be determined through cross-validation experiments. For very large values of $\lambda$, this gives $\Psi^*_\lambda \approx \Phi_M/\lambda$ and the result is average pooling. Therefore, $\lambda$ does not only play a regularization role, it also enables a smooth transition between the solution to Eqn. 10 ($\lambda = 0$) and average pooling ($\lambda \to \infty$). Accordingly, in the exemplary embodiment, $\lambda$ is selected to provide some influence on the pooling but not so great that average pooling is approximated.

In practice, for computing $\Psi^*_\lambda$ Eqn. (12) can be computed iteratively, for example using a gradient descent method, such as Conjugate Gradient Descent (CGD), which is designed for PSD matrices, or stochastic gradient descent. This approach may be computationally intensive if the embedding dimensionality D is large and the matrix $\Phi$ is full. However, the computation can be faster if the individual patch embeddings $\phi(x_i)$ are block sparse. By block sparse, it is meant that the indices of the embedding can be partitioned into a set of groups where the activation of one entry in a group means the activation of all entries in the group. This is the case, for instance, for the VLAD and the SV, where each group of indices corresponds to a given cluster centroid. This is also the case for the FV, if a hard assignment model is assumed, where each group corresponds to the gradients with respect to the parameters of a given Gaussian. In such a case, the matrix $\Phi\Phi^T$ is block-diagonal. Consequently) $\Phi\Phi^T + \lambda I$ is block diagonal and Eqn. (12) can be solved block-by-block, which is significantly less demanding than solving the full problem directly.

Relationship with Max Pooling

The proposed GMP mechanism can be related to max pooling. Let $\mathcal{P} = \{\phi(x_i), i=1 \ldots M\}$ denote the set of descriptor embeddings of a given image. It is assumed that these embeddings are drawn from a finite codebook of possible embeddings, $\phi(x_i) \in \{q_k, k=1 \ldots K\}$. Note that the codewords $q_k$ may be binary or real-valued. Let Q denote the D×K codebook matrix of possible embeddings where D is the output embedding dimensionality. Assuming that $Q = [q_1, \ldots, q_K]$ is orthonormal, $Q^T Q = I_K$ where $I_K$ is the K×K identity matrix. For instance, in the case of the BOV (with hard-assignment), D=K and the $q_k$'s are binary with only the k-th entry equal to 1, so that $Q = I_K$. Let $\pi_k$ denote the proportion of occurrences of $q_k$ in $\mathcal{P}$.

It can be shown that $\Psi^*$ does not depend on the proportions $\pi_k$, but only on the presence or absence of the $q_k$'s in $\mathcal{P}$. This can be proven as follows:

Let H denote the K×K diagonal matrix that contains the values $\pi_K$ on the diagonal. Rewrite $\Phi 1_M = Q\Pi 1_K$ and $\Phi\Phi^T = Q\Pi Q^T$. The latter quantity is the SVD decomposition of $\Phi\Phi^T$ and therefore $(\Phi\Phi^T)^+ = Q\Pi^+ Q^T$ Hence Eqn. (10) becomes $\Psi^* = Q\Pi^+ Q^T Q\Pi 1_K = Q(\Pi^+ \Pi) 1_K$. Since $\Pi$ is diagonal, its pseudo-inverse is diagonal and the values on the diagonal are equal to $1/\pi_k$ if $\pi_k \neq 0$ and 0 if $\pi_k = 0$. Therefore, $\Pi^+ \Pi$ is a diagonal matrix with element k on the diagonal equal to 1 if $\pi_k \neq 0$ and 0 otherwise. Therefore:

$$\Psi^* = \Sigma_{k:\pi_k \neq 0} q_k, \tag{13}$$

which does not depend on the proportions $\pi_k$, just on the presence or absence of the $q_k$'s in $\mathcal{P}$.

For the BOV, equation Eqn. (13) shows that $\Psi^*$ is a binary representation where each dimension informs on the presence/absence of each codeword in the image. This is exactly the max-pooled representation. Therefore, the GMP pooling mechanism can provide a generalization of max-pooling beyond the BOV.

In the regularized case of the BOV, assuming hard assignment, $\phi(x_i)$ is binary with a single entry corresponding to the codeword index. Therefore (13 corresponds to the (unnormalized) BOV histogram and $\Phi\Phi^T$ is a diagonal matrix with the BOV histogram on the diagonal. In such a case, Eqn. (12) can be rewritten as:

$$\Psi^*_\lambda = \frac{\Phi}{\Phi + \lambda'} \tag{14}$$

where the previous division should be understood as a term-by-term operation. With $\lambda$ infinitely small, this corresponds to the standard max-pooling mechanism.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use. The computer program product may be integral with the computer 18, (for example, an internal hard drive of RAM), or may be separate (for example, an external hard drive operatively connected with the computer 18), or may be separate and accessed via a digital data network such as a local area network (LAN) or the Internet (for example, as a redundant array of inexpensive of independent disks (RAID) or other network server storage that is indirectly accessed by the computer 18, via a digital network).

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hard-wired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually.

As will be appreciated, the steps of the method need not all proceed in the order illustrated and fewer, more, or different steps may be performed.

Further details on the method and system are now described by way of example.

Images

Images 14 may be received by the system 10 in any convenient file format, such as JPEG, GIF, JBIG, BMP, TIFF, or the like or other common file format used for images and which may optionally be converted to another suitable format prior to processing. Input images may be stored in data memory 22 during processing. Images 14 can be input from any suitable image source, such as a workstation, database, memory storage device, such as a disk, image capture device, retrieved from memory of the computer 34 or a web server, or the like. In general, each input digital image includes image data for an array of pixels forming the image. The images may be individual images, such as photographs, video images, or combined images, or the like. In general each image 14 may be a digital photograph. The image data of the image may include colorant values, such as grayscale values, for each of a set of color separations, such as L*a*b* or RGB, or be expressed in another color space in which different colors can be represented. In general, "grayscale" refers to the optical density value of any single color channel, however expressed (L*a*b*, RGB, YCbCr, etc.) and may include values for wavelength ranges outside the normal visible range, such as infrared or ultraviolet.

The exemplary image representations 12 are of a fixed dimensionality, i.e., each image representation has the same number of elements. In general, each image representation has at least 30, or at least 60, or at least 100, or at least 500 dimensions, and up to 1000 or more dimensions, each dimension having a respective feature value, which may be reduced to fewer dimensions, e.g., by principal component analysis (PCA).

Patch Extraction (S104)

The patch extractor 40 extracts and analyzes low level visual features of patches of the image 14, such as shape, texture, or color features, or the like. The patches can be obtained by image segmentation, by applying specific interest point detectors, by considering a regular grid, or simply by the random sampling of image patches. In the exemplary embodiment, the patches are extracted on a regular grid, optionally at multiple scales, over the entire image, or at least a part or a majority of the image. For example, at least 10 or at least 20 or at least 50, or at least 200, or at least 500, or at least 1000 patches are extracted from each image. Each patch may comprise at least 40 or at least 100 pixels, and up to 1,000,000 pixels or more.

Computing Patch Descriptors (S106)

The descriptor extractor 42 extracts a set of low level features in the form of a patch descriptor, such as a vector or histogram, from each patch. For example, as patch descriptors extracted from the patches, SIFT descriptors or other intensity gradient-based feature descriptors, can be used. See, e.g., Lowe, "Distinctive image features from scale-invariant keypoints," IJCV vol. 60 (2004). In one illustrative example employing SIFT features, the features are extracted from 32×32 pixel patches on regular grids (every 16 pixels) at five scales, using 128-dimensional SIFT descriptors. Other suitable local descriptors which can be extracted include simple 96-dimensional color features in which a patch is subdivided into 4×4 sub-regions and in each sub-region the mean and standard deviation are computed for the three channels (R, G and B). These are merely illustrative examples, and additional and/or other features can be used. The number of features in each local descriptor is optionally reduced, e.g., to 64 dimensions, using Principal Component Analysis (PCA).

Embedding (S108)

As noted above, the method is applicable to a variety of embedding techniques. As examples:

1. The Bag of Visual Words (BOV)

In this method, the patch descriptors of the patches of an image are assigned to clusters. For example, a visual vocabulary is previously obtained by clustering patch descriptors extracted from training images, using for instance K-means clustering analysis. Each patch vector is then assigned to a nearest cluster (visual word) in the previously trained vocabulary and a histogram of the assignments can be generated by accumulating the occurrences of each visual word.

For further details on the BOV embedding method, see U.S. Pub. No. 20070005356, entitled GENERIC VISUAL CATEGORIZATION METHOD AND SYSTEM, U.S. Pub. No. 20070258648, entitled GENERIC VISUAL CLASSIFICATION WITH GRADIENT COMPONENTS-BASED DIMENSIONALITY ENHANCEMENT, and U.S. Pub. No. 20080069456 entitled BAGS OF VISUAL CONTEXT-DEPENDENT WORDS FOR GENERIC VISUAL CATEGORIZATION, and Csurka 2004, the disclosures of which are incorporated herein by reference in their entireties.

2. The Efficient Match Kernel

The BOV representation can be viewed as being derived from a match kernel which counts 1 if two local features fall into the same regions partitioned by visual words and 0 otherwise. This quantization is sometimes too coarse, motivating research into the design of match kernels that more accurately measure the similarity between local features. However, it is impractical to use such kernels for large datasets due to their significant computational cost. To address this problem, efficient match kernels (EMK) have been proposed that map local features to a low dimensional feature space and average the resulting vectors to form a set-level feature. The local feature maps are learned so their inner products preserve, to the best extent possible, the values of the specified kernel function. See, Bo 2009.

An EMK uses explicit embedding functions $z(x)$, where $z(x)$ approximates a kernel $k(x_i, y_j)$ as $k(x_i, y_j) \approx z(x_i)^T z(y_j)$, to estimate SMKs using a single dot product. For classification, given two sets of elements $X=\{x_i; i=1, \ldots M\}$ and $Y=\{x'_j=1, \ldots N\}$, the sum match kernel may be estimated as:

$$K(X, Y) \approx \frac{1}{MN} \sum_{i=1}^{M} \sum_{j=1}^{N} z(x_i)^T z(x'_j) = \Phi(X)^T \Phi(Y)$$

3. The Fisher Vector (FV)

When the Fisher Vector (FV) is used for embedding it is assumed that a generative model of patches exists (such as a Gaussian Mixture Model (GMM)) from which all the patch descriptors are emitted, and the gradient of the log-likelihood of the descriptor is measured with respect to the parameters of the model. The exemplary mixture model is a Gaussian mixture model (GMM) comprising a set of Gaussian functions (Gaussians) to which weights are assigned in the parameter training. Each Gaussian is represented by its mean vector, and covariance matrix. It can be assumed that the covariance matrices are diagonal. See, e.g., Perronnin, et al., "Fisher kernels on visual vocabularies for image categorization" in CVPR (2007).

Each patch used for training can thus be characterized by a vector of weights, one weight for each of the Gaussian functions forming the mixture model. In this case, the visual vocabulary can be estimated using the Expectation-Maximization (EM) algorithm. The trained GMM is intended to describe the content of any image within a range of interest.

Methods for computing Fisher vectors are more fully described U.S. Pub. No. 20120076401, published Mar. 29, 2012, entitled IMAGE CLASSIFICATION EMPLOYING IMAGE VECTORS COMPRESSED USING VECTOR QUANTIZATION, by Jorge Sanchez, et al., U.S. Pub. No. 20120045134, published Feb. 23, 2012, entitled LARGE SCALE IMAGE CLASSIFICATION, by Florent Perronnin, et al., in Perronnin 2010, and Jorge Sanchez and Florent Perronnin, "High-dimensional signature compression for large-scale image classification," in CVPR 2011, the disclosures of which are incorporated herein by reference in their entireties.

Aggregation of Embedded Descriptors (S108)

As discussed above, in one embodiment, the GMP method includes:

1. Learning a set w of weights, one for each descriptor ($w=[w_1, \ldots w_M]$) such that the sum over all other descriptors $x_j$ of a weighted kernel between the descriptor $x_i$ and the other descriptor $x_j$ equals a constant value c, e.g., c=1:

$$\Sigma_{j=1}^{M} w_j k_\alpha(x_i, x_j) = c \text{ for } i=1 \ldots M \quad (15)$$

Each embedded descriptor is then assigned its respective weight $w_j$.

2. Aggregating the embedded descriptors, such as FV's, e.g., as a sum over all the embedded descriptors of the product of the respective weight and the embedded descriptor ($\Psi = \Sigma_{i=1}^{M} w_i \phi(x_i)$).

In the direct method, the pooling includes finding an image representation that optimizes Eqn. (8) e.g., through finding the image representation $\Psi$, denoted $\Psi^*_\lambda$, which minimizes the expression $\|\Phi^T\Psi - c_M\|^2 + \lambda\|\Psi\|^2$ (Eqn. 11), where $\Phi$ is the D×M matrix that contains the D-dimensional patch embeddings: $\Phi=[\phi(x_1), \ldots \phi(x_M)]$, $c_M$ is a vector in which all values are 1 (or other value of c) and $\lambda$ is the regularization parameter. In some embodiments, $\lambda$ is from 0.1 to 10,000. In other embodiments, $\lambda$ is from 1 to 1000.

Once again, the image representation is a sum of the weighted patch embeddings $\Psi = \Sigma_{i=1}^{M} w_i \phi(x_i)$. However, in the direct method, the weights are learned implicitly since the image representation $\Psi$ is learned directly by minimizing Eqn. (11).

Spatial Pyramids

To include spatial information about the image into the representation, the image can be partitioned into regions, the per-patch statistics aggregated at a region level, and then the region-level image representations concatenated to form the image representation. See, for example, S. Lazebnik, et al., "Beyond bags of features: Spatial pyramid matching for recognizing natural scene categories," CVPR '06 Proc. IEEE Computer Society Conf. on Computer Vision and Pattern Recognition, Volume 2, pp. 2169-2178 (2006).

In an exemplary embodiment, the low-level features are gradient features, such as SIFT descriptors, one per patch. The dimensionality of these descriptors may be reduced from 128 to 32 dimensions. A visual vocabulary of 16 or 64 Gaussians is used in the GMM and only the gradient with respect to the mean parameters is considered. The image 14 may be split into 4 regions (1 for the entire image and 3 vertical stripes). In the case of 64 Gaussians, this results in a 32×64×4=8,192-dimensional FV.

The image representation $\Psi$ may be indexed or compressed using conventional techniques (locality sensitive hashing (LSH), product quantization, principal component analysis (PCA), etc.) to speed up the process performed by the representation employing component and/or to use less data storage.

Classification

An exemplary classifier is a linear classifier which computes a kernel (e.g., a dot product) between the image representation and a trained classifier. Based on the computed kernel, the image is assigned to a respective class, or not (a binary decision), or is assigned a probability of being in the class.

The classifier may be trained by a method which includes, for each of a set of labeled training images, extracting a set of patch descriptors, as described for S104. The patch descriptors are embedded, as described for S108, using the same embedding function as selected for the input image. An image representation in the form of a multi-dimension vector is generated for each training image in a first multi-dimension vector space, using the GMP method as described for S110. The classifier is learned on the image representations and their respective labels. Any suitable classifier learning method may be employed which is suited to learning linear classifiers, such as Logistic Regression, Sparse Linear Regression, Sparse Multinomial Logistic Regression, support vector machines, or the like. The exemplary classifier is a binary classifier, although multiclass classifiers are also contemplated. The output of a set of binary classifiers may be combined to assign the image to one of a number of classes, or probabilistically over all classes.

While a liner classifier is used in the example embodiment, in other embodiments, a non-linear classifier may be learned.

Further details on classification methods are provided in U.S. Pub. Nos. 20030021481; 2007005356; 20070258648; 20080069456; 20080240572; 20080317358; 20090144033; 20090208118; 20100040285; 20100082615; 20100092084; 20100098343; 20100189354; 20100191743; 20100226564; 20100318477; 20110026831; 20110040711; 20110052063; 20110072012; 20110091105; 20110137898; 20110184950; 20120045134; 20120076401; 20120143853; 20120158739 20120163715, and 20130159292, the disclosures of which are incorporated herein by reference.

Without intending to limit the scope of the exemplary embodiment, the following examples demonstrate the applicability of the method to various classification tasks.

Examples

Datasets

Since it is to be expected that the GMP method will be more beneficial on fine-grained tasks where the most discriminative information might be associated with a handful of patches, the method was evaluated on four fine-grained image classification datasets: CUB-2010, CUB-2011, Oxford Pets, and Oxford Flowers. The PASCAL VOC 2007 dataset was also used, since it is one of the most widely used benchmarks in the image classification literature. On all these datasets, standard training, validation and test protocols were used. In the following, the best results which have been found reported are mentioned.

The Pascal VOC 2007 (VOC-2007) dataset contains 9,963 images of 20 classes (see, M. Everingham, et al., "The PASCAL Visual Object Classes Challenge 2007," Results (VOC 2007)). Performance on this dataset is measured with mean average precision (mAP). A performance of 61.7% mAP using the FV descriptor with spatial pyramids has been reported for this set. See, Perronnin 2010.

The CalTech UCSD birds 2010 (CUB-2010) dataset contains 6,033 images of 200 bird categories (see, S. Welinder, et al., "Caltech-UCSD Birds 200. Technical Report CNS-TR-2010-001, California Institute of Technology, pp. 1-15 ((2010)). Performance is measured with top-1 accuracy. A reported performance for the CUB-2010 dataset is 17.5% (see, A. Angelova and S. Zhu, "Efficient object detection and segmentation for fine-grained recognition," CVPR, pp. 811-818 (June 2013), "Angelova"). This method uses sparse coding in combination with object detection and segmentation prior to classification. Without detection and segmentation, Angelova reports that performance drops to 14.4%.

The CalTech UCSD birds 2011 (CUB-2011) dataset is an extension of CUB-2010 that contains 11,788 images of the same 200 bird categories (see, C. Wah, et al., "The Caltech-UCSD Birds-200-2011 Dataset," Technical Report CNS-TR-2011-001, CalTech (2011)). Performance is measured with top-1 accuracy. A reported performance for CUB-2011 is 56.8%. This was obtained using ground-truth bounding boxes and part detection (see, T. Berg and P. N. Belhumeur, "POOF: Part-Based One-vs-One Features for fine-grained categorization, face verification, and attribute estimation," CVPR, pp. 955-962 (2013)). Without ground-truth annotations or object localization, performance drops to 28.2% (see, J. A. Rodriguez and D. Larlus, "Predicting an object location using a global image representation," ICCV, 2013).

The Oxford-IIIT-Pet (Pets) dataset contains 7,349 images of 37 categories of cats and dogs (see, O. M. Parkhi, et al., "Cats and dogs," CVPR, pp. 3498-3505 (2012)). Performance is measured with top-1 accuracy. Angelova reports a performance for Pets of 54.3%. Without detection and segmentation, Angelova reports that performance drops to 50.8%.

The Oxford 102 Flowers (Flowers) dataset contains 8,189 images of 102 flower categories (see, M.-E. Nilsback and A. Zisserman, "Automated flower classification over a large number of classes," ICCVGIP 2008, pp. 722-729 (2008)). Performance is measured with top-1 accuracy. Angelova reports a performance for Flowers of 80.7. Again, without detection and segmentation performance drops to 76.7%.

Descriptors

Patches were extracted densely at multiple scales resulting in approximately 10,000 descriptors per image. Two types of low-level descriptors were evaluated: 128-dimension SIFT descriptors (see, D. G. Lowe, "Distinctive image features from scale-invariant keypoints," IJCV (2004)), and 96-dimension color descriptors (see, S. Clinchant, et al., "XRCEs participation to ImagEval, "ImageEval workshop at CVIR (2007)). In both cases, their dimensionality was reduced to 64 dimensions with PCA.

As mentioned earlier, the GMP method is general and can be applied to any aggregated representation. Having shown, and verified experimentally, the formal equivalence between GMP and standard max-pooling in the BOV case, results for the BOV are not reported. The evaluation focuses on two aggregated representations: the EMK (see, Bo 2009) and the FV (see F. Perronnin and C. Dance, "Fisher kernels on visual vocabularies for image categorization," CVPR, pp. 1-8 (2007)).

Results with the EMK

To compute the EMK representations the method of Bo 2009 was followed: descriptors were projected on random Gaussian directions, a cosine non-linearity was applied and the responses aggregated. The EMK is a vocabulary-free approach which does not perform any quantization and as a result preserves minute and highly-localized image details. The EMK is thus especially relevant for fine-grained problems. However, since all embeddings are pooled together rather than within Voronoi regions as with vocabulary-based approaches, the EMK is particularly susceptible to the effect of frequent descriptors. Therefore GMP is expected to have a significant positive impact on the EMK performance. There is no other method which has been applied to the EMK to counteract frequent descriptors. In particular, power normalization heuristics which are used for vocabulary-based approaches such as the BOV or the FV are not applicable.

The EMK representation has two parameters: the number of output dimensions D (the number of random projections) and the bandwidth $\sigma$ of the Gaussian kernel from which the random directions are drawn. The dimension D was set to 2048 for all experiments as there was negligible improvement in performance for larger values. $\sigma$ was chosen through cross-validation. The choice of A (the regularization parameter of the GMK) has a significant impact on the final performance and was chosen by cross-validation from the set $\{10^1, 10^2, 10^3, 10^4, 10^5\}$. Spatial pyramids were not employed.

Results for the baseline EMK (no mitigation of frequent descriptors) and the EMK with the exemplary GMP method are shown in Table 1.

TABLE 1

Results using EMK on 5 classification datasets for SIFT descriptors, color descriptors, and late fusion of SIFT and color.

| | VOC-2007 | | CUB-2010 | | CUB-2011 | | Pets | | Flowers | |
|---|---|---|---|---|---|---|---|---|---|---|
| Descriptor | Baseline | GMP | Baseline | GMP | Baseline | GMP | Baseline | GMP | Baseline | GMP |
| SIFT | 42.2 | 46.0 | 2.9 | 6.4 | 5.0 | 10.6 | 21.7 | 35.6 | 41.3 | 52.2 |
| Color | 31.7 | 34.8 | 2.8 | 12.1 | 3.5 | 22.0 | 13.7 | 28.4 | 41.8 | 58.7 |
| Fusion | 43.9 | 49.7 | 3.4 | 12.8 | 5.0 | 24.9 | 22.8 | 42.4 | 54.0 | 70.8 |

As seen in TABLE 1, a significant improvement in performance, between 3% and 27%, is achieved for all datasets when using GMP. This indicates that suppressing frequent descriptors is indeed beneficial when using EMKs. On the fine-grained datasets, the improvements are particularly impressive, 15% on average.

Results with the FV

To construct the FV, for each descriptor, the gradient of the log-likelihood with respect to the parameters of a Gaussian Mixture Model (GMM) were computed and the gradients pooled. For the FV, increasing the number of Gaussians G counteracts the negative effects of frequent descriptors as fewer and fewer descriptors are assigned to the same Gaussian. Therefore it was expected that the GMP would have a smaller impact than for the EMK, particularly as G increases. Except as noted for the VOC-2007 dataset, spatial pyramids were not used.

Experiments were conducted for FVs with the number of Gaussians G set to either 16 or 256, leading to 2,048-dimension and 32,768-dimension vectors respectively. Values of G of 16 and 256 were chosen in order to have a comparable dimensionality to that of the EMK representation in the former case, and to have a state-of-the-art FV representation in the latter case. The value of $\lambda$ was once again chosen by cross-validation from the set $\{10^1, 10^2, 10^3, 10^4, 10^5\}$.

1. Power-Normalization Baseline:

The baseline method uses power normalization, a state-of-the-art and post-hoc approach for improving the pooled FV representation (Perronnin 2010). The power a in prior evaluations has usually been set to 0.5. Here, $\alpha=0.5$ was also found to be optimal for VOC-2007 for SIFT descriptors. However it has been shown, in the context of image retrieval, that a lower value of $\alpha$ often achieves significant performance gains. The same effect for classification was observed here. Therefore, the value of the $\alpha$ parameter was cross-validated. The following set of 5 values was evaluated: $\{1.0, 0.75, 0.5, 0.25, 0.0\}$. Note that for $\alpha=0$, the method of F. Perronnin, et al., "Large-scale image retrieval with compressed fisher vectors," CVPR, pp. 3384-3391 (2010) was used and the power normalization applied only to non-zero entries. The best-performing a (the value that led to the best results on the validation set) is denoted $\alpha^*$ in Table 2. The $\alpha^*$ was determined on a per-descriptor and per-dataset basis. Hence, the $\alpha^*$ baseline is a very competitive one. For instance, for CUB-2011, performance with late fusion and G=256 increases to 29.8% from 25.4% when $\alpha=\alpha^*$ as opposed to $\alpha=0.5$. Note that $\alpha=1$ corresponds to an unmodified FV with no power-normalization.

2. GMP-No Power-Normalization:

Results are shown in Table 2. The GMP approach consistently performs significantly better than having no normalization ($\alpha=1$) (10% better on average for late fusion and G=256). The improvement is particularly impressive for several fine-grained datasets. For instance, for CUB-2011, GMP obtains a top-1 accuracy of 30.4% compared to 13.2% with $\alpha=1$.

3. GMP with Power-Normalization:

GMP almost always outperforms power-normalization for all datasets for G=16. The average improvement for late fusion is 2.6%. As expected, as G increases to 256, GMP has less of an impact, but still outperforms power-normalization by 0.7% on average, with late fusion.

On the Flowers dataset with late fusion and G=256, 83.5% and 82.2% respectively were obtain for $\alpha^*$ and GMP. These outperform the previous best reported values (80.7%, Angelova). Also, on the Pets dataset with late fusion and G=256, GMP obtains top-1 accuracy of 55.7%, compared to 54.0% with power normalization, an increase in performance of 1.7%. This is to our knowledge the best-reported result for this dataset, out-performing the best previous reported (54.3%, Angelova). Therefore GMP achieves or exceeds the performance of the ad-hoc power-normalization technique, while being more principled and more general.

4. Effect of Spatial Pyramids:

Additional experiments were run on the VOC-2007 dataset to investigate the effect of the method when using Spatial Pyramids (SPs). A coarse pyramid was used and 4 FVs were extracted per image: one FV for the whole image and one FV each for three horizontal stripes corresponding to the top, middle and bottom regions of the image. With SPs, GMP again afforded improvements with respect to power normalization. For instance, with late fusion and G=256, GMP obtains 62.0% compared to 60.2% for the $\alpha^*$ baseline, a 1.8% increase in performance.

5. Effect of the Number of Gaussians G:

As expected, there is a consistent and significant positive impact on performance when G is increased from 16 to 256. The GMP approach is complementary to increasing G, as performance is generally improved when more Gaussians are used and GMP is applied. Furthermore, GMP is particularly attractive when low-dimensional FVs must be used.

Table 2 shows results using the FV on 5 classification datasets for SIFT descriptors, color descriptors, and late fusion of SIFT and color: Results are shown for a number of Gaussians G=16 and G=256, also for $\alpha=1$ (i.e., no power normalization) and $\alpha=\alpha^*$ (best-performing power-normalization), and for the GMP approach.

TABLE 2

| | Descriptor | VOC-2007 $\alpha=1$ | VOC-2007 $\alpha=\alpha^*$ | VOC-2007 GMP | CUB-2010 $\alpha=1$ | CUB-2010 $\alpha=\alpha^*$ | CUB-2010 GMP | CUB-2011 $\alpha=1$ | CUB-2011 $\alpha=\alpha^*$ | CUB-2011 GMP |
|---|---|---|---|---|---|---|---|---|---|---|
| G = 16 | SIFT | 48.8 | 51.7 | 52.7 | 3.7 | 6.7 | 6.4 | 7.9 | 11.0 | 11.5 |
| | Color | 39.7 | 43.6 | 45.5 | 5.6 | 9.2 | 13.6 | 7.2 | 16.8 | 21.6 |
| | Fusion | 52.2 | 55.1 | 56.8 | 5.8 | 10.2 | 14.3 | 10.0 | 18.9 | 22.8 |
| G = 256 | SIFT | 52.6 | 57.7 | 58.1 | 5.3 | 8.1 | 7.7 | 10.2 | 16.3 | 16.4 |
| | Color | 39.4 | 49.3 | 50.0 | 4.1 | 13.8 | 15.1 | 9.0 | 26.4 | 27.0 |
| | Fusion | 54.8 | 60.6 | 61.6 | 5.9 | 15.3 | 16.7 | 13.2 | 29.8 | 30.4 |

| | Descriptor | Pets $\alpha=1$ | Pets $\alpha=\alpha^*$ | Pets GMP | Flowers $\alpha=1$ | Flowers $\alpha=\alpha^*$ | Flowers GMP |
|---|---|---|---|---|---|---|---|
| G = 16 | SIFT | 29.3 | 32.1 | 35.1 | 58.3 | 63.8 | 63.8 |
| | Color | 22.6 | 29.1 | 32.5 | 55.3 | 65.3 | 65.9 |
| | Fusion | 33.6 | 39.8 | 42.9 | 69.9 | 77.5 | 78.8 |
| G = 256 | SIFT | 38.0 | 46.9 | 47.9 | 67.7 | 73.0 | 72.8 |
| | Color | 23.6 | 41.0 | 41.6 | 63.8 | 74.4 | 72.8 |
| | Fusion | 40.5 | 54.0 | 55.7 | 77.2 | 83.5 | 82.2 |

From Tables 1 and 2 it is clear that the baseline EMK results are quite poor in comparison with the baseline FV results. However, for CUB-2010, CUB-2011, and Pets, the GMP approach improves the EMK performance to the point that EMK results with GMP are comparable to FV results with GMP when G=16 (with G=16, the FV and EMK representations are both 2048-dimensional). In fact, for CUB-2011, EMK with GMP is superior to FV with GMP for G=16 (24.9% vs 22.8%).

The exemplary principled and general method for pooling patch-level descriptors thus equalizes the influence of frequent and rare descriptors, preserving discriminating information in the resulting aggregated representation. The generalized max pooling (GMP) approach is applicable to any SMK and can thus be seen as an extension of max pooling, which can only be applied to count-based representations such as BOV. Extensive experiments on several public datasets show that GMP performs on par with, and sometimes significantly better than, heuristic alternatives.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for generating an image representation comprising:
   generating a set of embedded patch descriptors, comprising, for each of a set of patches of an image,
      extracting a patch descriptor which is representative of the pixels in the patch; and
      embedding the patch descriptor in a multidimensional space to form an embedded patch descriptor;
   generating an image representation comprising aggregating the set of embedded patch descriptors, wherein in the aggregation, each patch descriptor is weighted with a respective weight in a set of weights, the set of weights being computed based on the extracted patch descriptors for the image, wherein the generating of the image representation comprises identifying an image representation that optimizes the probability that when a matrix of the embedded patch descriptors is multiplied by the image representation, the result is a vector in which each element of the vector has a constant same value, the optimization including identifying an image representation $\Psi$ that minimizes the expression $\|\Phi^T\Psi - c_M\|^2 + \lambda\|\Psi\|^2$, where $\Phi$ is a D×M matrix that contains the D-dimensional patch embeddings, $c_M$ is the vector in which all values are the same, and $\lambda$ represents a non-zero regularization parameter; and
   outputting information based on the image representation, wherein at least one of the extracting of the patch descriptors, embedding of the patch descriptors, generating the image representation, and outputting information is performed with a computer processor.

2. The method of claim 1, wherein the generating of the image representation comprises learning the set of weights such that when the evaluation of a kernel function between a first patch descriptor selected from the set of patch descriptors and one other patch descriptor from the set of descriptors is weighted by the weight of the other patch descriptor and summed over all the patch descriptors, the sum is a constant value for each of the patch descriptors when treated as the first patch descriptor.

3. The method of claim 1, wherein $\lambda$ is selected from a range of 1 to 10,000.

4. The method of claim 1, wherein the optimization is performed by Conjugate Gradient Descent.

5. The method of claim 1, wherein the generating an image representation comprises normalizing the aggregation of weighted image descriptors.

6. The method of claim 1, wherein the aggregation of image weighted descriptors comprises a sum of the weighted image descriptors.

7. The method of claim 1, wherein the method further comprises extracting the patches from the image.

8. The method of claim 1, wherein embedding of the patch descriptor comprises computing higher-order statistics which assume the patch descriptor is emitted by a generative model.

9. The method of claim 1, wherein the set of patches comprises at least 100 patches.

10. The method of claim 1, wherein the extracting of the patch descriptor comprises extracting at least one of an intensity gradient-based descriptor and a color descriptor.

11. The method of claim 1, further comprising classifying the image based on the image representation and wherein the outputting information comprises outputting information based on the classification.

12. The method of claim 11, wherein the classification is performed with a linear classifier.

13. The method of claim 1, wherein the outputting information comprises computing a similarity between two images as a function of a dot product between image representations of the two images generated by the method of claim 1.

14. A computer program product comprising a non-transitory recording medium storing instructions, which when executed on a computer causes the computer to perform a method comprising:
   generating a set of embedded patch descriptors, comprising, for each of a set of patches of an image,
      extracting a patch descriptor which is representative of the pixels in the patch; and
      embedding the patch descriptor in a multidimensional space to form an embedded patch descriptor;
   generating an image representation comprising aggregating the set of embedded patch descriptors, wherein in the aggregation, each patch descriptor is weighted with a respective weight in a set of weights, the set of weights being computed based on the extracted patch descriptors for the image, which includes optimizing one of:
      $\Phi^T\Psi = c_M$, and
      $Kw = c_M$,
      where $\Phi$ is a D×M matrix that contains M of the D-dimensional embedded patch descriptors, $\Psi$ is the image representation, and $c_M$ is a vector in which each of the M elements has a constant, same value, K is an M×M kernel matrix between individual patch descriptors and w is an M×1 vector of the weights; and
   outputting information based on the image representation, wherein at least one of the extracting of the patch descriptors, embedding of the patch descriptors, generating the image representation, and outputting information is performed with a computer processor.

15. A system comprising memory storing instructions for performing the method of claim 1 and a processor in communication with the memory which executes the instructions.

16. A system for generating an image representation comprising:

a descriptor extractor which extracts a set of patch descriptors, each patch descriptor being representative of the pixels in a patch of an image;

an embedding component which embeds each of the patch descriptors in a multidimensional space to form a respective embedded patch descriptor;

a pooling component which aggregates the set of embedded descriptors, wherein in the aggregation, each patch descriptor is weighted with a respective weight in a set of weights, the set of weights being computed based on the extracted patch descriptors for the image, which includes optimizing one of:

$\Phi^T \Psi = c_M$, and $Kw = c_M$, where $\Phi$ is a D×M matrix that contains M of the D-dimensional embedded patch descriptors, W is the image representation, and $c_M$ is a vector in which each of the M elements has a constant, same value, K is an M×M kernel matrix between individual patch descriptors and w is an M×1 vector of the weights; and a processor which implements the descriptor extractor, embedding component, and pooling component.

17. A method for generating an image representation comprising:

for each of a set of M patches of an image, extracting a patch descriptor which is representative of the pixels in the patch and embedding the patch descriptor in a multidimensional space with an embedding function to form a D-dimensional embedded descriptor;

with a processor, generating a representation of the image comprising aggregating the embedded descriptors as $\Psi = \Sigma_{i=1}^{M} w_i \phi(x_i)$, where $\Psi$ is the aggregated representation, $\phi(x_i)$ represents one of the M embedded patch descriptors and $w_i$ represents a respective weight, the weights being selected by one of:

a) finding a vector $w = [mw_1, \ldots, w_M]$ that minimizes the expression:

$$\|\Phi^T \Phi W - c_M\|^2 - \lambda \|w\|^2$$

where $\Phi$ is a D×M matrix that contains the D-dimensional embedded patch descriptors, $c_M$ is a vector in which all values are a same constant value, and $\lambda$ is a non-negative regularization parameter; and b) finding the aggregated representation W that minimizes the expression:

$$\|\Phi^T \Psi - c_M\|^2 + \lambda \|\Psi\|^2 \qquad \text{(Eqn. 11)},$$

where $\Phi$ is a D×M matrix that contains the D-dimensional embedded patch descriptors, $c_M$ is a vector in which all values are all a same constant value, and $\lambda$ is a non-negative regularization parameter; and generating an image representation based on $\Psi$.

18. A computer program product comprising a non-transitory recording medium storing instructions, which when executed on a computer causes the computer to perform the method of claim 17.

* * * * *